US006827168B2

(12) United States Patent
Miyazaki (10) Patent No.: US 6,827,168 B2
(45) Date of Patent: Dec. 7, 2004

(54) AUTOMOTIVE EQUIPMENT MOUNTING STRUCTURE

(75) Inventor: Toshihisa Miyazaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/156,959

(22) Filed: May 30, 2002

(65) Prior Publication Data

US 2002/0191385 A1 Dec. 19, 2002

(30) Foreign Application Priority Data

Jun. 13, 2001 (JP) .................................... P. 2001-178219

(51) Int. Cl.[7] .............................................. B60R 16/04
(52) U.S. Cl. ...................... 180/68.5; 180/274; 439/622
(58) Field of Search ................................ 180/68.5, 274, 180/271; 280/784; 439/621, 622, 34; 248/548

(56) References Cited

U.S. PATENT DOCUMENTS

| 4,174,014 A | * | 11/1979 | Bjorksten ................... 180/68.5 |
| 5,476,151 A | * | 12/1995 | Tsuchida et al. ............ 180/274 |
| 5,555,950 A | * | 9/1996 | Harada et al. ............. 180/65.1 |
| 5,643,693 A | * | 7/1997 | Hill et al. .................... 429/121 |
| 5,645,448 A | * | 7/1997 | Hill ............................. 439/522 |
| 6,371,229 B1 | * | 4/2002 | Kakiuchi .................... 180/65.2 |
| 6,547,020 B2 | * | 4/2003 | Maus et al. ................ 180/68.5 |

FOREIGN PATENT DOCUMENTS

| JP | 06-270697 | 9/1994 |
| JP | 10-023637 | 1/1998 |

* cited by examiner

*Primary Examiner*—Christopher P. Ellis
*Assistant Examiner*—Jeff Restifo
(74) *Attorney, Agent, or Firm*—Arent Fox PLLC (57) ABSTRACT

A battery is mounted to a front part of a wheel house/damper housing, and a relay box as automotive equipment is mounted to the rear of the battery via front and rear stays in such a manner as to be separated upwardly. A guide surface is formed at a front end of a lower side of the relay box, and a corner at a rear end of the battery is made to face the guide surface. When the battery is moved rearward in a vehicle collision, the relay box is moved upwardly by a load transmitted thereto from the battery via the guide surface to thereby be separated from the vehicle body. Accordingly, the impact absorbing performance can be increased by preventing the disturbance of the relay box to the rear movement of the battery, and damage to the relay box can be suppressed to a minimum level.

18 Claims, 6 Drawing Sheets

AUTOMOTIVE EQUIPMENT MOUNTING STRUCTURE

BACKGROUND OF THE INVENTION

1. Field of the Invention

The present invention relates to an automotive equipment mounting structure in which automotive equipment is mounted via mounting portions to a vehicle body in the vicinity of a battery which is also mounted to the vehicle body.

2. Description of the Related Art

Automotive equipment of various types is disposed in an engine compartment. When the automotive equipment is strongly fixed to a vehicle body, a crush stroke of the vehicle body is reduced by the automotive equipment thus strongly fixed to the vehicle body in collision of the vehicle. This leading to a risk of the reduction of impact absorbing effect. In addition, in the event that the automotive equipment comprising electric equipment is damaged due to the impact generated by the collision, there is caused a risk that functions of other electric equipment may be adversely affected by disconnection or short-circuit that would be caused when the electric equipment is so damaged.

Japanese Patent Unexamined Publication Hei. 6-270697 (JP-A-6-270697) discloses an automotive equipment mounting structure in which automotive equipment such as an inverter for a driving motor for an electric vehicle, an auxiliary battery and an inverter for an air conditioner, is disposed in a longitudinal direction of the vehicle and is then connected to one another with links which are inclined relative the longitudinal direction. According to this structure, in case that the vehicle is in collision and in turn an impact is applied to the vehicle from the front, the auxiliary battery, which is disposed centrally, is moved upwardly due to the function of the links while the inverters disposed before and after the auxiliary battery are moved downwardly, whereby the automotive equipment is prevented from interfering with one another to thereby secure a crush stroke for the vehicle body so as not only to effectively absorb the impact generated by the collision but also to prevent the damage of the automotive equipment. Furthermore, the above-mentioned Japanese Patent unexamined publication discloses an automotive equipment mounting structure in which an engaging portion and a portion to be engaged are provided on an engine compartment hood and automotive equipment, respectively, whereby when the engine compartment hood is pressed from the front and is then bent upwardly when the vehicle is brought into collision, the engaging portion on the hood and the portion to be engaged on the automotive equipment are brought into engagement with each other, so that the automotive equipment is lifted upwardly, a crush stroke for the vehicle being thereby secured.

In addition, Japanese Patent Unexamined Publication No. Hei. 10-23637 (JP-A-10-23637) discloses an automotive equipment mounting structure in which a casing for accommodating automotive equipment comprising a junction box for branching and connecting a wiring harness is constituted by a main body and a lid. The main body has a V-shaped groove extending in a transverse direction of the vehicle, and the lid covers an opening in an upper surface of the main body. According to the construction, when an impact is exerted from the front and the vehicle is brought into collision the main body of the casing is press collapsed at a portion thereof where the V-shaped groove is formed so as to absorb the impact so exerted. Moreover, the lid is separated from the main body upwardly so as to absorb the impact, whereby a damage to the junction box can be prevented.

Incidentally, with the mounting structure described in JP-A-6-270697, since a plurality of pieces of automotive equipment need to be connected to one another with the links, the number of components is increased. Accordingly, production costs would be increased, and also there is a risk that the links may not be able to exhibit sufficiently the required function in the event that the impact from a collision deviates from an expected direction. In addition, with the automotive equipment mounting structure in which the automotive equipment is lifted upwardly by allowing the engaging portion on the engine compartment hood to engage with the portion to be engaged on the automotive equipment, since the engaging portion needs to be provided on the engine compartment hood at a position closer to the front, there is caused a problem that the structure is difficult to be applied to automotive equipment that is disposed at a more rearward position than the engaging portion.

In addition, with the automotive equipment mounting structure described in JP-A-10-23637, since the casing needs to be designed larger in order to provide a sufficient amount to be collapsed for effective protection of the junction box when in collision, the casing tends to become larger than a size which is normally required for the junction box, which is disadvantageous in terms of space efficiency.

SUMMARY OF THE INVENTION

The invention was made in these situations. It is an object of the present invention to prevent the reduction in impact absorbing effect due to the interference of automotive equipment when a vehicle is brought into collision while limiting the damage to the automotive equipment to a minimum level.

With a view to attaining the object, according to a first aspect of the invention, there is provided an automotive equipment mounting structure in which a battery is mounted to a vehicle body and automotive equipment is mounted via mounting portions to the vehicle body at a position in the vicinity of the battery, wherein a guide member is provided at a location where the battery that would be moved by a load generated when a vehicle is brought into collision interferes with the automotive equipment, whereby the automotive equipment is moved apart from the vehicle body in a predetermined direction by a load transmitted thereto from the battery via the guide member.

According to the construction, since the guide member is provided at the location where the battery that would be moved by a load generated when a vehicle is brought into collision interferes with the automotive equipment, so that the automotive equipment is moved apart from the vehicle body in the predetermined direction by a load transmitted thereto from the battery via the guide member. Accordingly, the impact absorbing performance can be increased by preventing the interference of the automotive equipment with other members that would also be moved by the impact so generated when the vehicle is brought into collision, and also the damage that would be made to the automotive equipment can be suppressed to a minimum level.

According to a second aspect of the invention, there is provided an automotive equipment mounting structure as set forth in the first aspect of the invention, wherein the guide member is constituted by a plate-like member provided at least one of the automotive equipment and the battery.

According to the construction, since the guide member is constituted by the plate-like member provided at least one of the automotive equipment and the battery, the movement of the battery due to the collision of the vehicle can effectively be transmitted to the automotive equipment via the guide member.

According to a third aspect of the invention, there is provided an automotive equipment mounting structure as set forth in the first or second aspect of the invention, wherein the automotive equipment is mounted to the vehicle body via the mounting portions which each have an inserting or clip-hold construction, whereby the automotive equipment is dislocated from the mounting portions, to thereby be separated from the vehicle body when the automotive equipment is moved in the predetermined direction in the vehicle collision.

According to the construction, since when the automotive equipment is moved in the predetermined direction due to the impact generated in the vehicle collision, the mounting portions are dislocated so that the automotive equipment is released from the restrained state by the mounting portions. Accordingly the interference of the automotive equipment with other members and also the damage to the automotive equipment can be prevented more effectively.

According to a fourth aspect of the invention, there is provided an automotive equipment mounting structure as set forth in any of the first to third aspects of the invention, wherein the mounting portions are constructed so as to be disconnected from the automotive equipment when the translation of the battery reaches or exceeds a predetermined value.

According to the construction, since the mounting portions for mounting the automotive equipment to the vehicle body are constructed so as to be disconnected from the automotive equipment when the translation of the battery reaches or exceeds the predetermined value, the mounting portions are dislocated when a collision equal to or larger than a certain magnitude occurs. Accordingly, it is ensured that the automotive equipment is released from the restrained state.

According to a fifth aspect of the invention, there is provided an automotive equipment mounting structure as set forth in any of the first to fourth aspects of the invention, wherein the automotive equipment is electric equipment, and wherein a wiring harness connecting continuously to the electric equipment is loosely supported on the vehicle body.

According to the construction, since the wiring harness which connects to the electric equipment which is the automatic equipment is loosely supported on the vehicle body, there is no risk that the movement of the automotive equipment is prevented by the wiring harness.

According to a sixth aspect of the invention, there is provided an automotive equipment mounting structure as set forth in any of the first to fifth aspects of the invention, wherein a hood is provided which is designed to be bent upwardly at a predetermined position thereof by a load generated in the vehicle collision, and wherein the automotive equipment is moved toward a space formed by the hood when the hood is so bent.

According to the construction, since the hood is designed to be bent upwardly at the predetermined position thereof by a load generated when the vehicle is brought into collision, the automotive equipment is allowed to be moved toward the space formed by the hood when it is so bent, whereby the disturbance to the movement of the automotive equipment that would be caused by the interference of the automotive equipment with the hood can be avoided.

The invention may be more fully understood from the description of preferred embodiments of the invention, as set forth below, together with the accompanying drawings.

DETAILED DESCRIPTION OF THE PREFERRED EMBODIMENT

A preferable embodiment according to the invention will be described below based on an embodiment of the invention.

Figure 1:
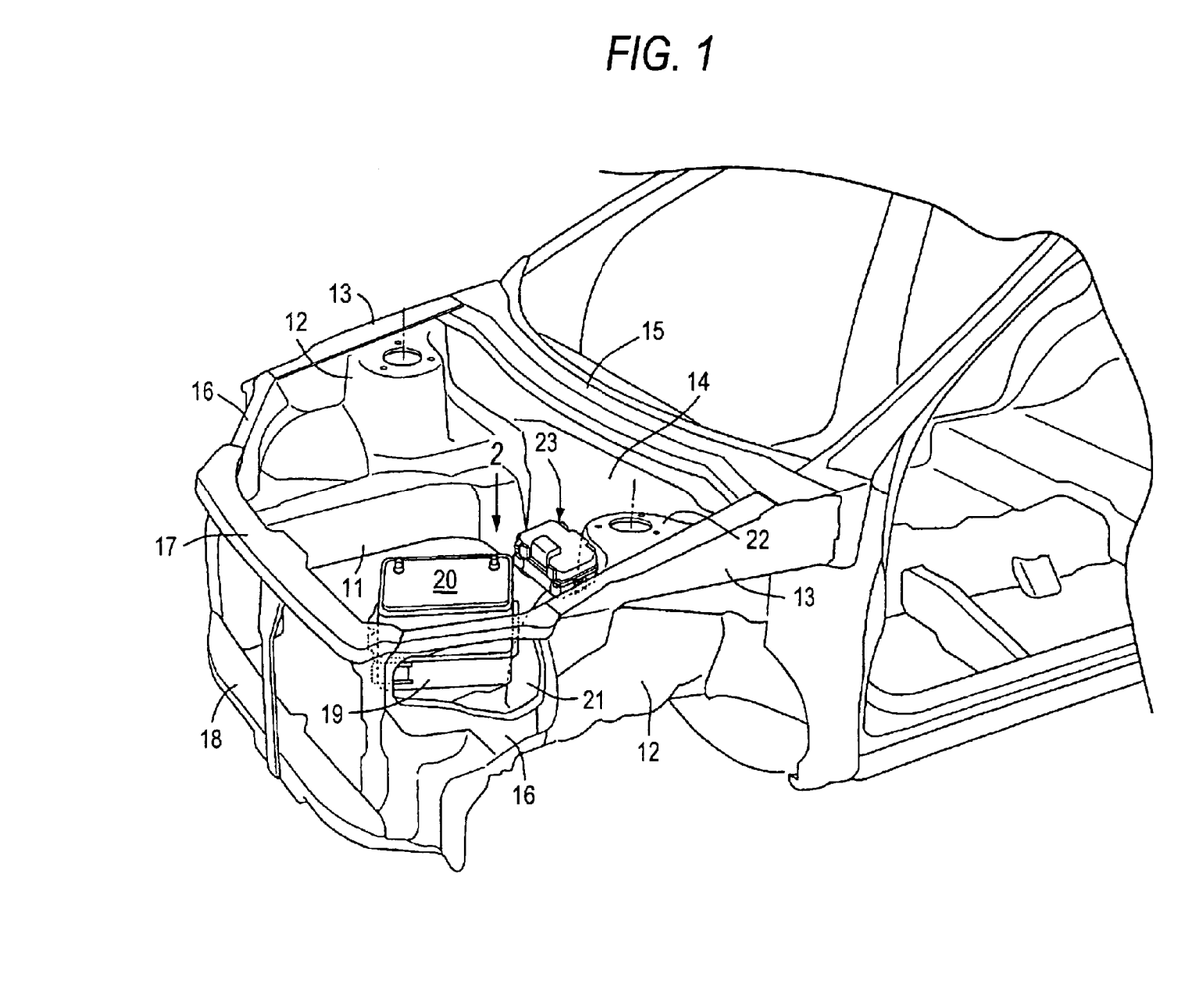
FIG. 1 is a perspective view of an engine compartment.
Figure 2:
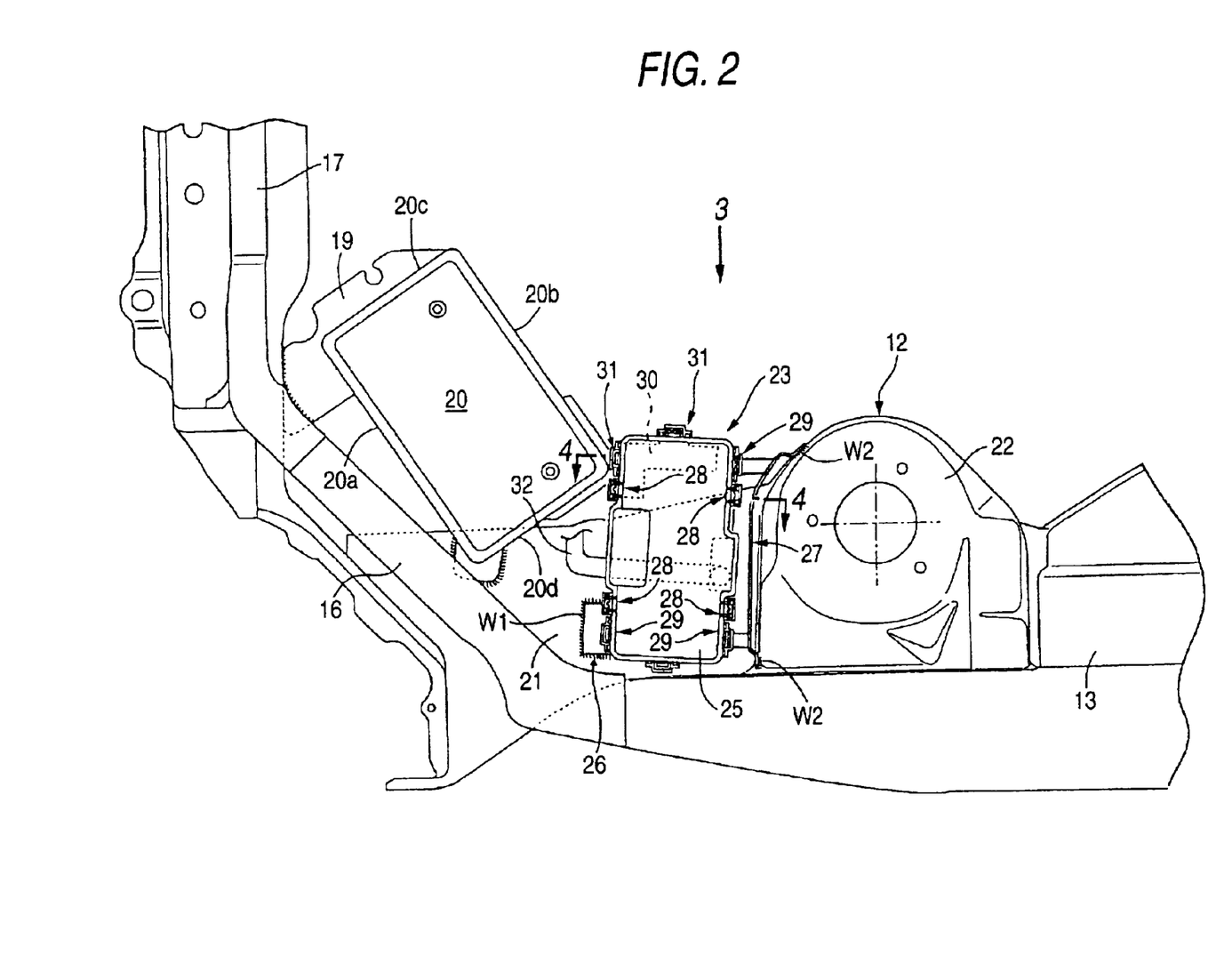
FIG. 2 is an enlarged view of FIG. 1 as viewed in a direction indicated by an arrow denoted by reference numeral 2 therein.
Figure 3:
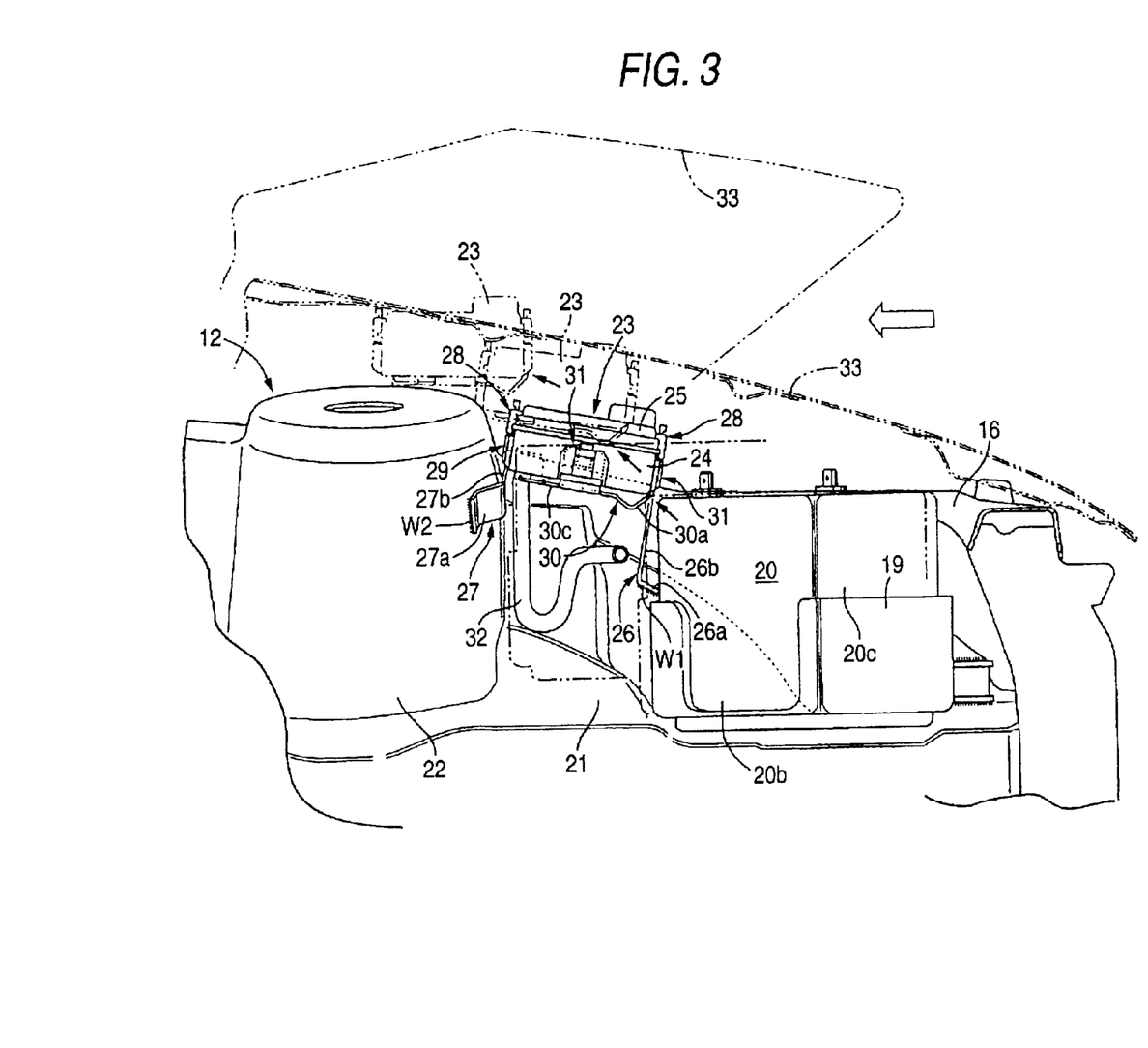
FIG. 3 is a view of FIG. 2 as viewed in a direction indicated by an arrow denoted by reference numeral 3 therein.
Figure 4:
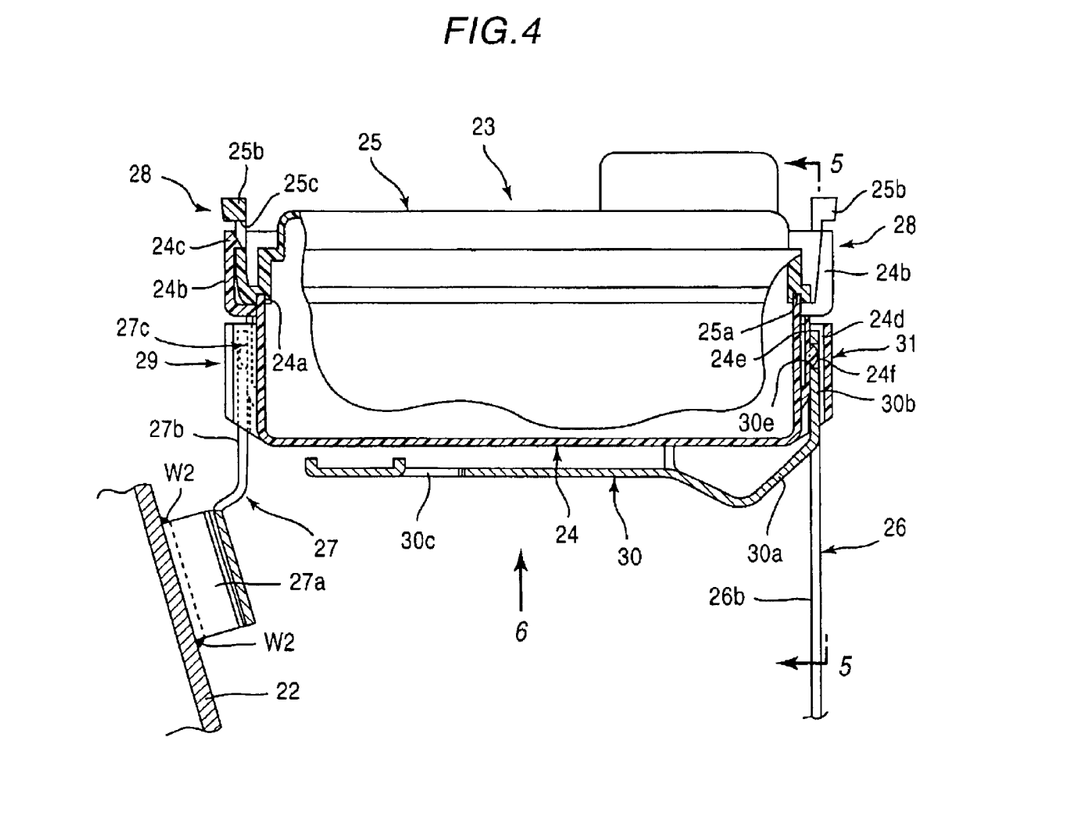
FIG. 4 is a sectional view taken along the line 4—4 in FIG. 2.
Figure 5:
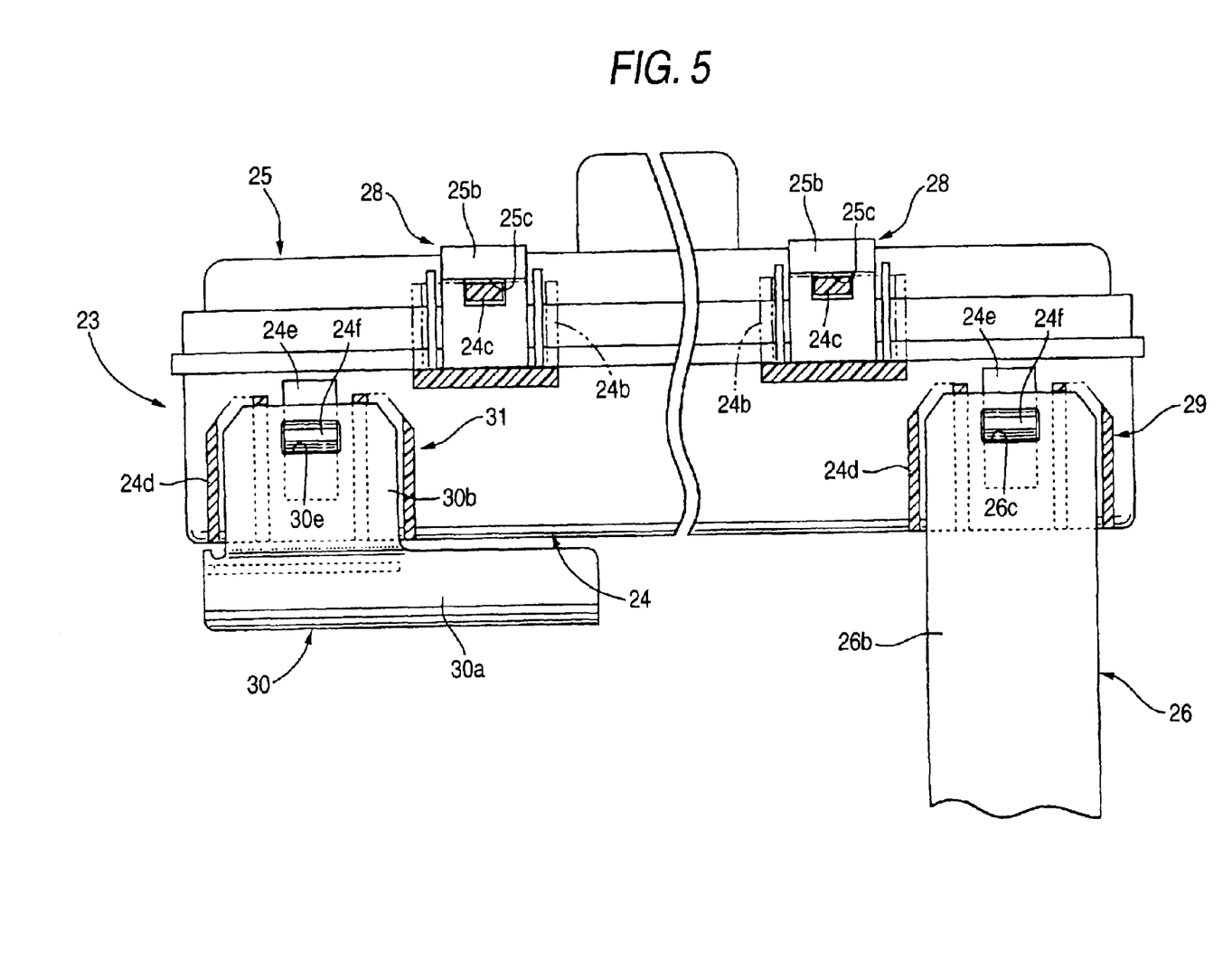
FIG. 5 is a sectional view taken along the line 5—5 in FIG. 4.
Figure 6:
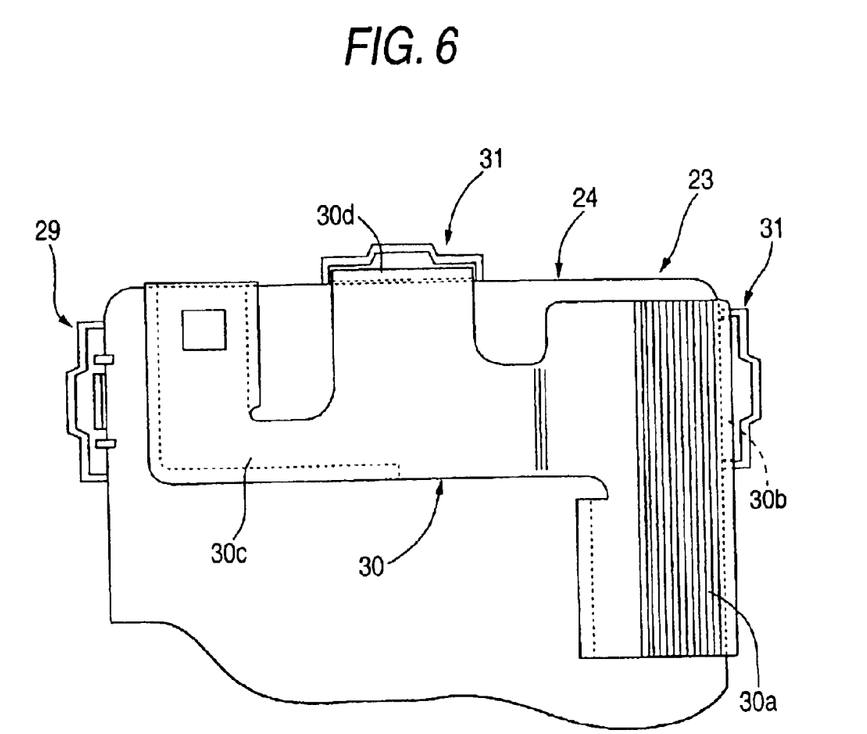
FIG. 6 is a view of FIG. 4 as viewed in a direction indicated by an arrow denoted by reference numeral 6 therein.

FIGS. 1 to 6 show an embodiment of the invention, in which FIG. 1 is a perspective view of an engine compartment, FIG. 2 is an enlarged view of FIG. 1 as viewed in a direction indicated by an arrow denoted by reference numeral 2 therein, FIG. 3 is a view of FIG. 2 as viewed in a direction indicated by an arrow denoted by reference numeral 3 therein, FIG. 4 is a sectional view taken along the line 4—4 in FIG. 2, FIG. 5 is a sectional view taken along the line 5—5 in FIG. 4, and FIG. 6 is a view of FIG. 4 as viewed in a direction indicated by an arrow denoted by reference numeral 6 therein.

As shown in FIGS. 1 to 3, an engine compartment of a four-wheel vehicle comprises a pair of left and right front side frames 11, 11, a pair of left and right wheel houses/damper housings 12, 12 which are welded to the left and right front side frames 11, 11, respectively, and a pair of left and right wheel house upper members 13, 13 which are welded to the left and right wheel houses/damper housings 12, 12, respectively. The engine compartment also comprises a dash panel 14 welded between rear ends of the wheel houses/damper housings 12, 12, a windshield lower 15 welded to an upper surface of the dash panel 14, and a pair of left and right front side bulkheads 16, 16 welded to front ends of the left and right wheel houses/damper housings 12, 12, respectively. The engine compartment further comprise a bulkhead upper center frame 17 welded between upper front ends of the front side bulkheads 16, 16, and a front lower cross member 18 welded between lower front ends of the front side bulkheads 16, 16.

A battery support tray 19 is welded to an internal surface of the left front side bulkhead 16, and a battery 20 is supported on an upper surface of the tray 19. As is clear from FIG. 2, a left-hand side 20a of the parallelepipedal battery 20 is disposed to be inclined along the internal surface of the front side bulkhead 16. A corner or edge between the left-hand side 20a and a front side 20c of the battery 20 is situated at a front-most position of a body of the vehicle, whereas a corner or edge between a right-hand side 20b and a rear side 20d of the battery is situated at a rear-most position of the vehicle body.

The left-hand wheel house/damper housing 12 integrally comprises a front wheel house 21 and a rear damper housing 22, and a relay box 23, which is automotive equipment, is supported in a space facing an upper surface of the wheel house 21 and a front side of the damper housing 22. The relay box 23 is generally formed into a parallelepipedal configuration and is divided into to portions such as a lower main body 24 and an upper lid 25.

As is clear when referring to FIGS. 4 to 6 together, a first stay 26 for supporting the relay box 23 at a front side thereof comprises a base portion 26a which is welded W1 to an upper surface of the wheel house 21 and a support portion 26b which is made to rise from the base portion 26a, and a quadrangle locking hole 26c is formed in an upper end of the support portion 26b. On the other hand, a second stay 27 for supporting the relay box 23 at a rear side thereof comprises a base portion 27a which is welded W2 to the front side of the damper housing 22 and a pair of support portions 27b, 27b which are made to rise from the base portion 27, and quadrangle locking holes 27c, 27c are formed in upper ends of the respective support portions 27b, 27b.

A rib 24a is provided around an upper edge of the main body 24 of the relay box 23 which opens upwardly, and a groove 25a is formed around a lower edge of the lid 25 thereof, whereby the main body 24 and the lid 25 are made integral with clips 28 provided two on each of the front and rear of the relay box 23 with the rib 24b being fitted in the groove 25a. The four (4) clips 28 each have the same construction in which a locking pawl 24c is provided at an upper end of a plate-like portion 24b having a higher rigidity which extends upwardly from a side of the main body 24, while a locking pawl 25b is provided at an upper end of a plate-like portion 25b having a lower rigidity which extends upwardly from a side of the lit 25. Consequently, when the lid 25 is fitted on the main body 24 from above the plate-like portion 25b of the lid 25 is pressed by the locking pawl 24c of the main body 24 so as to deflect inwardly, whereby the locking pawl 24c of the main body 24 fits in the locking hole 25c in the lid 25. When the lid 25 is separated from the main body 24 the plate-like portion 25b of the lid 25 is caused to deflect inwardly so that the locking pawl 24c is dislocated from the locking hole 25c, and the lid 25 only has to be drawn upwardly in that condition.

Clips 29 for supporting the relay box 23 at the upper ends of the first stay 26 and the second stay 27 each have the same construction. Disposed in the interior of a guide portion 24d provided to protrude from a side of the main body 24 of the relay box 23 in such a manner to be put therethrough vertically is a plate 24e which is constructed such that a lower portion is supported, whereas an upper portion is allowed to freely deflect, and a locking pawl 24f is provided on an external side of the plate 24e. Consequently, when the support portion 26b of the first stay 26 (or the support portion 27b of the second stay 27) is inserted into the guide portion 24d of the clip 29 from below the plate 24e deflects, and the locking pawl 24f is brought into engagement with the locking hole 26c (or the locking hole 27c), whereby the relay box 23 is supported at the upper ends of the first stay 26 and the second stay 27.

Furthermore, a plate-like member 30 is fixed to the main body 24 of the relay box 23 at a position which is closer to a right-hand side of the main body 24 (closer to the center of the engine compartment) in such a manner as to extend from the front side to a lower side of the main body 24. The plate-like member 30 comprises, at a position corresponding to the rear of an upper end of a corner or edge formed between a right-hand side 20b and a rear side 20d of the battery 20, a guide surface 30a which inclines from a front upper portion to a rear lower portion. The plate-like member also comprises a support portion 30b which extends upwardly along a front end of the guide surface 30a to the front side of the main body 24 of the relay box 23. The plate-like member 30 further comprises a support portion 30d which extends upwardly along the right-hand side of the main body 24 of the relay box 23 from an intermediate position along the length of an rearward extension 30c which extends to the rear from a rear end of the guide surface 30a 30e along the lower side of the main body 24 of the relay box 23. Then, quadrangle locking holes 30e, are formed in upper ends of the two support portions 30b, 30d.

The support portions 30b, 30d of the plate-like member 30 are fixed to the front side and right-hand side of the main body 24 of the relay box 23 via clips 31, 31 which each have the same construction as that of the three (3) clips 29 which support the relay box 23 at the support portion 26b of the first stay 26 and the support portions 27b, 27b of the second stay 27.

As is clear from FIG. 3, a wiring harness 32 continuously connecting to the relay box 23 extends downwardly once, then bends upwardly and finally extends horizontally. Th, the wiring harness 32 is given to an extra length to its minimum required length and is thereby loosely disposed in the engine compartment.

Next, the function of the embodiment of the invention constructed as has been described heretofore will be described.

When the vehicle is brought into collision, an impact from the front forcedly collapses to the rear the bulkhead upper center frame 17, front lower cross member 18, front side bulkhead 16, 16, front side frames 11, 11, wheel houses/damper housings 12, 12, and the wheel house upper members 13, 13. At this time, the impact also moves rearward the battery 20 supported on the battery support tray 19 which is made integral with the left front side bulkhead 16. When the battery 20 is so moved to the rear the upper end of the corner or edge between the right-hand side 20b and the rear side 20d of the battery 20 interferes with the guide surface 30a of the plate-like member 30 fixed to the relay box 23. The battery 20 thus moved pushes upwardly the relay box 23 together with the guide surface 30a. Thus, when the relay box 23 is pushed upwardly over a predetermined distance corresponding to the withdrawal of the battery 20 the locking pawls 24f of the three (3) clips 29 provided on the main body 24 of the relay box 23 are forcedly dislocated from the locking holes 26c, 27c, 27c formed in the support portions 26b, 27b, 27b of the first and second stays 26, 27, whereby the relay box 23 is separated upwardly from the first and second stays 26, 27.

As this occurs, since stiffeners are disposed at predetermined positions in predetermined configurations on the back of an engine compartment hood 33 which covers the engine compartment in order to reinforce the hood 33, the engine compartment hood 33 is bent upwardly at a portion corresponding to the relay box 23, whereby a space is secured thereat into which the relay box 23 is received after it has been separated from the stays. Thus, since the relay box 23 which has resided ahead of the damper housing 22 having a relatively high rigidity which constitutes the rear portion of the wheel house/damper housing 12 is allowed to move upwardly, as well as to freely move to the rear along the upper surface of the damper housing 22 after the relay box 23 has been released from the engagement with the first and second stays 26, 27, the battery 20 is allowed to withdraw to the position where the damper housing 22 is located without interference with the relay box 23, whereby a sufficient crush stroke can be secured for absorption of the impact generated from the collision of the vehicle. As this occurs, since the wiring harness 32 continuously connecting to the relay box 23 is loosely disposed, there is no risk of the upward movement of the relay box 23 being disturbed by the wiring harness 32.

In addition, since the relay box 23 is allowed to withdraw in the upward direction at the time of collision of the vehicle, the relay box 23 is made difficult to be damaged, whereby adverse effect onto other electric equipment that would be caused by disconnection or short-circuit happening in the interior of the relay box 23 can be suppressed to a minimum level.

Thus, while the embodiment of the invention has been described in detail heretofore, the invention may be modified variously with respect to its design without departing from the spirit and scope thereof. For example, while the plate-like member 30 having the guide surface 30a is provided on the relay box 23 side in the embodiment, the plate-like member 30 may be provided on the battery 20 side.

In addition, while the battery 20 and the relay box 23 are mounted to the front side bulkhead 16 in the embodiment, they may be mounted on any optional member in the engine compartment.

Furthermore, while the relay box 23 is described as the automotive equipment in the embodiment, the invention may be applied to any other optional automotive equipment than the relay box 23.

Moreover, while the first stay 26, the second stay 27 and the clips 29 are described as the mounting portions each having the inserting clip-hold construction in the embodiment, the invention may adopt any other optional inserting construction than the inserting clip-hold construction.

In addition, while the invention is described as being applied to the battery 20 and the relay box 23 which are disposed in the engine compartment, the invention may be applied to a battery 20 and other automotive equipment which are disposed in a boot of the vehicle, in which case the hood is not the engine compartment hood but is a boot lid.

Note that a front side bulkhead 16 one of example of the vehicle body of the invention. A relay box 23 described in an embodiment is also one of example of the automotive equipment of the invention. Further, a first stay 26, a second stay 27 and third stay 29 described in the embodiment are one of example of the mounting portions each having an inserting or clip-hold construction. Moreover, an engine compartment hood 33 described in the embodiment is one of example of the hood in the invention.

As has been described heretofore, according to the first aspect of the invention, since the guide surface is provided at the location where the battery that would be moved by a load generated in a vehicle collision interferes with the automotive equipment, so that the automotive equipment is moved apart from the vehicle body in the predetermined direction by a load transmitted thereto from the battery via the guide surface. Accordingly, the impact absorbing performance can be increased by preventing the interference of the automotive equipment with other members that would also be moved by the impact so generated in the vehicle collision, and also the damage that would be made to the automotive equipment can be suppressed to a minimum level.

According to the second aspect of the invention, since the guide surface is constituted by the plate-like member provided at least one of the automotive equipment and the battery, the movement of the battery due to the collision of the vehicle can effectively be transmitted to the automotive equipment via the guide surface.

According to the third aspect of the invention, since when the automotive equipment is moved in the predetermined direction due to the impact generated when the vehicle is brought into collision the mounting portions are dislocated so that the automotive equipment is released from the restrained state by the mounting portions, not only the interference of the automotive equipment with other members but also the damage to the automotive equipment can be prevented more effectively.

According to the fourth aspect of the invention, since the mounting portions for mounting the automotive equipment to the vehicle body are constructed so as to be disconnected from the automotive equipment when the translation of the battery reaches or exceeds the predetermined value, the mounting portions are dislocated when a collision equal to or larger than a certain magnitude occurs, so that it is ensured that the automotive equipment is released from the restrained state.

According to the fifth aspect of the invention, since the wiring harness which connects to the electric equipment which is the automatic equipment is loosely supported on the vehicle body, there is no risk that the movement of the automotive equipment is prevented by the wiring harness.

According to the sixth aspect of the invention, since the hood is designed to be bent upwardly at the predetermined position thereof by a load generated when the vehicle is brought into collision, the automotive equipment is allowed to be moved toward the space formed by the hood when it is so bent, whereby the disturbance to the movement of the automotive equipment that would be caused by the interference of the automotive equipment with the hood can be avoided.

While the invention has been described by reference to the specific embodiments chosen for the purpose of illustration, it should be apparent that numerous modifications could be made thereto by those skilled in the art without departing from the spirit and scope of the invention.

What is claimed is:

1. An automotive equipment mounting structure comprising:

a battery mounted to a vehicle body;

an automotive equipment mounted via mounting portions to the vehicle body at a position in the vicinity of said battery, and a guide member provided at a location where said battery that would be moved by a load generated in a vehicle collision, interferes with said automotive equipment, wherein said automotive equipment is moved apart from said vehicle body in a predetermined direction by a load transmitted thereto from said battery via said guide member, wherein each of said mounting portions comprises an inserting or clip-hold structure having a locking pawl which snap fits into a locking aperture defined in said automotive equipment, and wherein said automotive equipment is dislocated from said mounting portions and separated from said vehicle body when said automotive equipment is moved in the predetermined direction in the vehicle collision.

2. The automotive equipment mounting structure as set forth in claim 1, wherein said guide member forms a plate member provided on at least one of said automotive equipment and said battery.

3. The automotive equipment mounting structure as set forth in claim 2, wherein said mounting portions are constructed so as to be disconnected from said automotive equipment when the translation of said battery reaches or exceeds a predetermined value.

4. The automotive equipment mounting structure as set forth in claim 3, wherein said automotive equipment comprises:
   an electric equipment; and
   a wiring harness connecting continuously to said electric equipment and being loosely supported on said vehicle body.

5. The automotive equipment mounting structure as set forth in claim 2, wherein said automotive equipment comprises:
   an electric equipment; and
   a wiring harness connecting continuously to said electric equipment and being loosely supported on said vehicle body.

6. The automotive equipment mounting structure as set forth in claim 2, further comprising:
   a hood being bendable upwardly at a predetermined position thereof by a load generated in the vehicle collision,
   wherein said automotive equipment is moved toward a space that is formed by said hood when said hood is so bent.

7. The automotive equipment mounting structure as set forth in claim 1, wherein said mounting portions are constructed so as to be disconnected from said automotive equipment when the translation of said battery reaches or exceeds a predetermined value.

8. The automotive equipment mounting structure as set forth in claim 7, wherein said automotive equipment comprises:
   an electric equipment; and
   a wiring harness connecting continuously to said electric equipment and being loosely supported on said vehicle body.

9. The automotive equipment mounting structure as set forth in claim 1, wherein said automotive equipment comprises:
   an electric equipment; and
   a wiring harness connecting continuously to said electric equipment and being loosely supported on said vehicle body.

10. The automotive equipment mounting structure as set forth in claim 1, further comprising:
    a hood being bendable upwardly at a predetermined position thereof by a load generated in the vehicle collision,
    wherein said automotive equipment is moved toward a space that is formed by said hood when said hood is so bent.

11. The automotive equipment mounting structure according to claim 1, further comprising an intermediate support portion extending upward from an intermediate position of an extension extending rearward from a rear end of an inclined guide surface.

12. An automotive equipment mounting structure comprising:
    a battery mounted to a vehicle body;
    an automotive equipment mounted via mounting portions to the vehicle body at a position in the vicinity of said battery; and
    a guide member comprising:
       a guide surface inclined relative to a longitudinal axis of the vehicle body;
       a support portion extending vertically relative to the longitudinal axis of the vehicle body from a front end of the inclined guide surface; and
       an extension extending rearward from a rear end of the inclined guide surface;
    wherein said guide member is provided at a location where said battery that would be moved by a load generated in a vehicle collision interferes with said automotive equipment, and
    wherein said automotive equipment is moved apart from said vehicle body in a predetermined direction by a load transmitted thereto from said battery via said guide member.

13. The automotive equipment mounting structure as set forth in claim 12, wherein said guide member forms a plate member provided on at least one of said automotive equipment and said battery.

14. The automotive equipment mounting structure as set forth in claim 12, wherein each of said mounting portions comprises an inserting or clip-hold structure, and wherein said automotive equipment is dislocated from said mounting portions and separated from said vehicle body when said automotive equipment is moved in the predetermined direction in the vehicle collision.

15. The automotive equipment mounting structure as set forth in claim 14, wherein said mounting portions are constructed so as to be disconnected from said automotive equipment when the translation of said battery reaches or exceeds a predetermined value.

16. The automotive equipment mounting structure according to claim 14, further comprising an intermediate support portion extending upward from an intermediate position of an extension extending rearward from a rear end of an inclined guide surface.

17. The automotive equipment mounting structure as set forth in claim 12, wherein said automotive equipment comprises:
    an electric equipment; and
    a wiring harness connecting continuously to said electric equipment and being loosely supported on said vehicle body.

18. The automotive equipment mounting structure as set forth in claim 12, further comprising:
    a hood being bendable upwardly at a predetermined position thereof by a load generated in the vehicle collision,
    wherein said automotive equipment is moved toward a space that is formed by said hood when said hood is so bent.

* * * * *